United States Patent [19]

Lamb

[11] Patent Number: 5,691,587
[45] Date of Patent: Nov. 25, 1997

[54] MAGNETIC CENTRIFUGAL CLUTCH

[75] Inventor: Karl J. Lamb, Port Angeles, Wash.

[73] Assignee: Magna Force, Inc., Port Angeles, Wash.

[21] Appl. No.: 616,370

[22] Filed: Mar. 15, 1996

Related U.S. Application Data

[63] Continuation-in-part of Ser. No. 546,066, Oct. 20, 1995, which is a continuation of Ser. No. 237,031, May 3, 1994, Pat. No. 5,477,094, which is a continuation-in-part of Ser. No. 65,867, May 21, 1993, Pat. No. 5,477,093.

[51] Int. Cl.$^6$ ............................ H02K 49/00; H02P 15/00
[52] U.S. Cl. ........................ 310/103; 310/75 D; 310/92; 192/80; 192/94
[58] Field of Search .................... 310/103, 75 D, 310/92; 192/80, 94

[56] References Cited

U.S. PATENT DOCUMENTS

| | | | |
|---|---|---|---|
| 3,573,517 | 4/1971 | Osterstrom | 310/103 |
| 4,876,471 | 10/1989 | Lacour | 310/105 |
| 4,896,754 | 1/1990 | Carlson et al. | 192/21.5 |
| 5,099,974 | 3/1992 | Spechko | 192/415 |
| 5,158,279 | 10/1992 | Laffet et al. | 271/272 |
| 5,252,874 | 10/1993 | Viegas | 310/103 |
| 5,264,755 | 11/1993 | Hettlage et al. | 310/238 |
| 5,439,086 | 8/1995 | Withey | 192/56 R |

*Primary Examiner*—Thomas M. Dougherty
*Assistant Examiner*—Elvin G. Enad
*Attorney, Agent, or Firm*—Seed and Berry LLP

[57] ABSTRACT

A magnetic coupling device has an electroconductive rotor presenting a band of electroconductive material and has a magnet rotor with permanent magnets which are slide-mounted to move radially outward responsive to centrifugal force in opposition to a spring bias. When the magnet rotor is stationary the magnets are radially inward of the orbit of the electroconductive band, and when the magnets have moved outwardly when the magnet rotor is rotating, the magnets are spaced by an air gap from the electroconductive band so that eddy currents are induced in the band resulting in coupling of the rotors. The electroconductive rotor preferably has two such bands positioned on opposite sides of the magnet rotor. The rotors may have sheaves mounted thereon.

32 Claims, 9 Drawing Sheets

MAGNETIC CENTRIFUGAL CLUTCH

CROSS-REFERENCE

This application is a continuation-in-part of my copending application Ser. No. 08/546,066, filed Oct. 20, 1995, which is a continuation of the application Ser. No. 237,031 filed May, 3, 1994, issued as U.S. Pat. No. 5,477,094 issued Dec. 19, 1995 which is a continuation-in-part of Ser. No. 065,867 filed May, 21, 1993, now U.S. Pat. No. 5,477,093 issued Dec. 19, 1995.

Technical Field

This invention relates to mechanical centrifugal clutches which automatically engage in opposition to a disengaging spring bias responsive to a build-up in speed of a power source. The invention also relates to soft start couplers.

BACKGROUND OF THE INVENTION

Self-energizing centrifugal clutches commonly have friction shoes which move outwardly against a drum on an output shaft responsive to centrifugal force resulting from powering an input shaft in a predetermined speed range. Springs cause the shoes to retract when the input shaft slows below a prescribed level. When the clutch is engaged vibration is transferred between the input and output shafts via the clutch and this is more pronounced when the shafts are not perfectly aligned.

Accordingly, there has been a need for a self-energizing clutch which will not transfer vibration between the driving and driven components, will not subject its parts to wear, and does not require precise alignment between its input and output rotary parts.

Couplers with a soft start characteristic require less power for startup because the full load is not coupled to the driving motor or other power source until the motor has accelerated to an adequate rotational velocity to take on the load. Although couplers such as disclosed in my prior U.S. Pat. No. 5,477,094 have soft start capabilities when properly matched with a load, there are instances where a still softer start is preferred while preserving the other advantages of the coupler.

SUMMARY OF THE INVENTION

The present invention meets the foregoing needs in the centrifugal clutch art by providing a magnetic clutch in which permanent magnets on a drive rotor are moved by centrifugal force outwardly in opposition to a spring bias from an inactive position to an active position where they are spaced by an air gap from an electroconductive ring on a driven rotor. As a result eddy currents are induced in the electroconductive ring, thereby causing the driven rotor to rotate with the driving rotor by magnetic action, sometimes referred to as magnetic friction. It is preferred to have the driven rotor provided with two spaced electroconductive rings between which the magnets move with each magnet exposing its poles to respective ones of the rings. Each of the magnets has its poles reversed relative to the poles of the two adjacent magnets. The magnets are mounted in holders arranged to slide radially of the magnet rotor. Springs extend between the holders and the magnet rotor to bias the holders inwardly away from the electroconductive ring(s).

Since the magnet rotor and its magnets are always spaced from the driven rotor and its electroconductive rings, vibration is not transferred through the clutch, the rotors need not be in axial alignment, and there is no wear between the driving and driven parts.

The clutch of the present invention inherently has a soft start characteristic. However, the clutch can be used as a soft start coupler with a superior soft start characteristic by reversing the starting roles of the magnet rotor and the driven rotor, and having the magnets on the magnet rotor arranged to have a starting position wherein they are part way overlapped by one or both of the electroconductive ring(s). Accordingly, when the rotor with the electroconductive rings is rotated by a motor or other power source the magnet rotor starts to rotate by magnetic friction and builds up speed as the magnet exposure to the electroconductive ring(s) increases due to outward movement of the magnet holders responsive to the increasing centrifugal force.

DETAILED DESCRIPTION OF THE INVENTION

Figure 1:
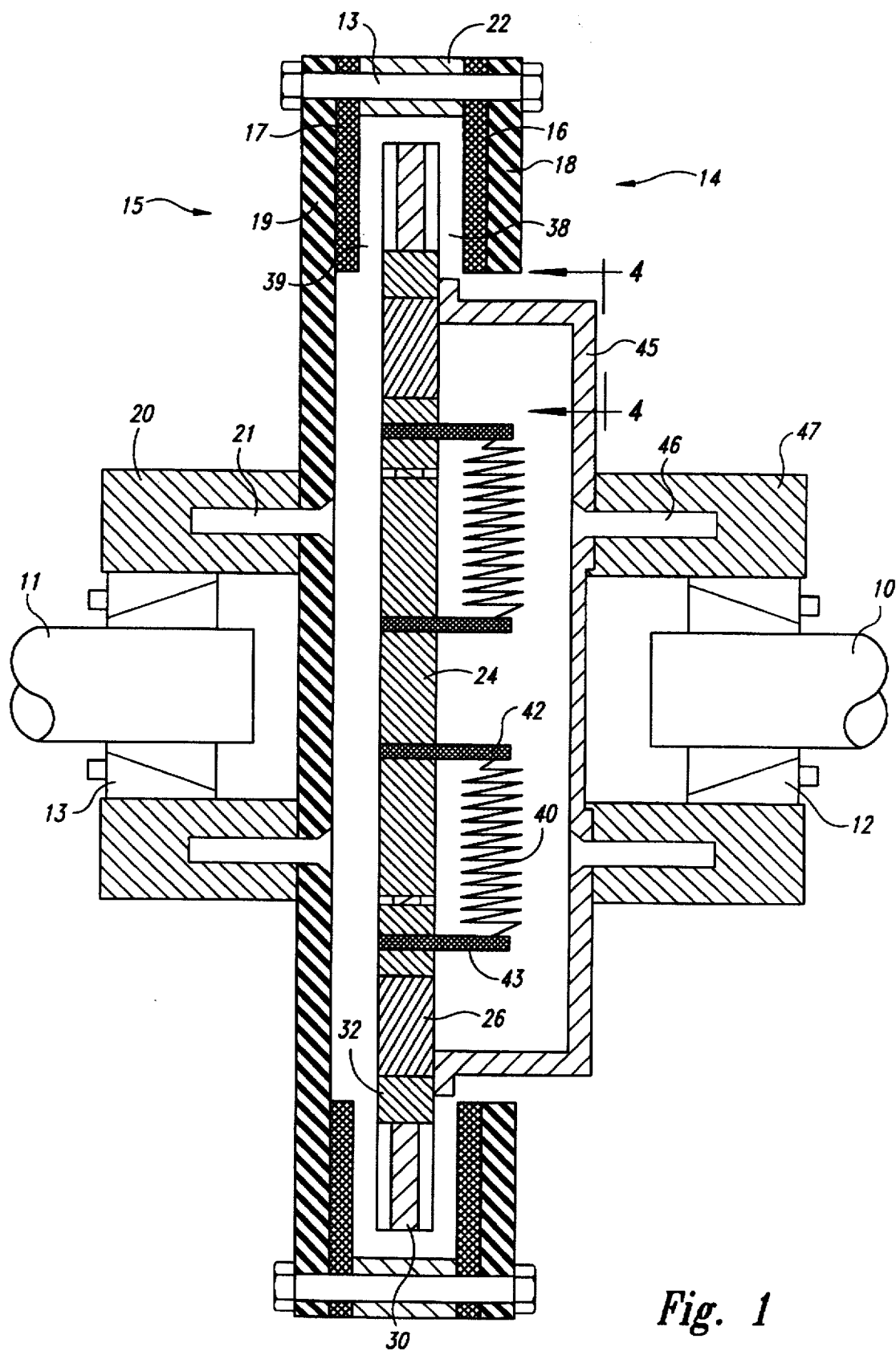
FIG. 1 is a longitudinal cross-sectional view through a first embodiment of the invention.

Referring to the first embodiment of the invention (FIGS. 1–4), input and output shafts 10–11 are connected by couplings 12–13 to a magnet rotor unit 14 and electroconductive rotor unit 15. The electroconductive rotor unit presents two axially-spaced flat rings (continuous bands) 16–17 having good electroconductive characteristics such, for example, as copper or aluminum. Ring 16 is mounted on a ferrous backing ring 18 and ring 17 is mounted on a circular ferrous backing plate 19 which is in turn mounted on a hub 20 as by bolts 21. Spacers in the form of sleeves 22 separate the electroconductive rings 16–17 and they are held by bolts 23 passing through the electroconductive rings 16–17, the backing ring 18 and backing plate 19.

The magnet rotor 14 unit includes a disc 24 having sets 26 of permanent magnets 26a–26b slide-mounted for radial movement relative to the center of the disc. This can be accomplished by providing radial cutouts 28 in the disc 24 each having two parallel sides formed with central tracks 30 therealong for slidably receiving generally rectangular magnet holders 32. The tracks 30 may take the form of elongated lands which fit into longitudinal grooves 34 in the side edges of the magnet holders 32 so that the holders 32 and disc 24 have a tongue and groove sliding interfit.

Figure 2:
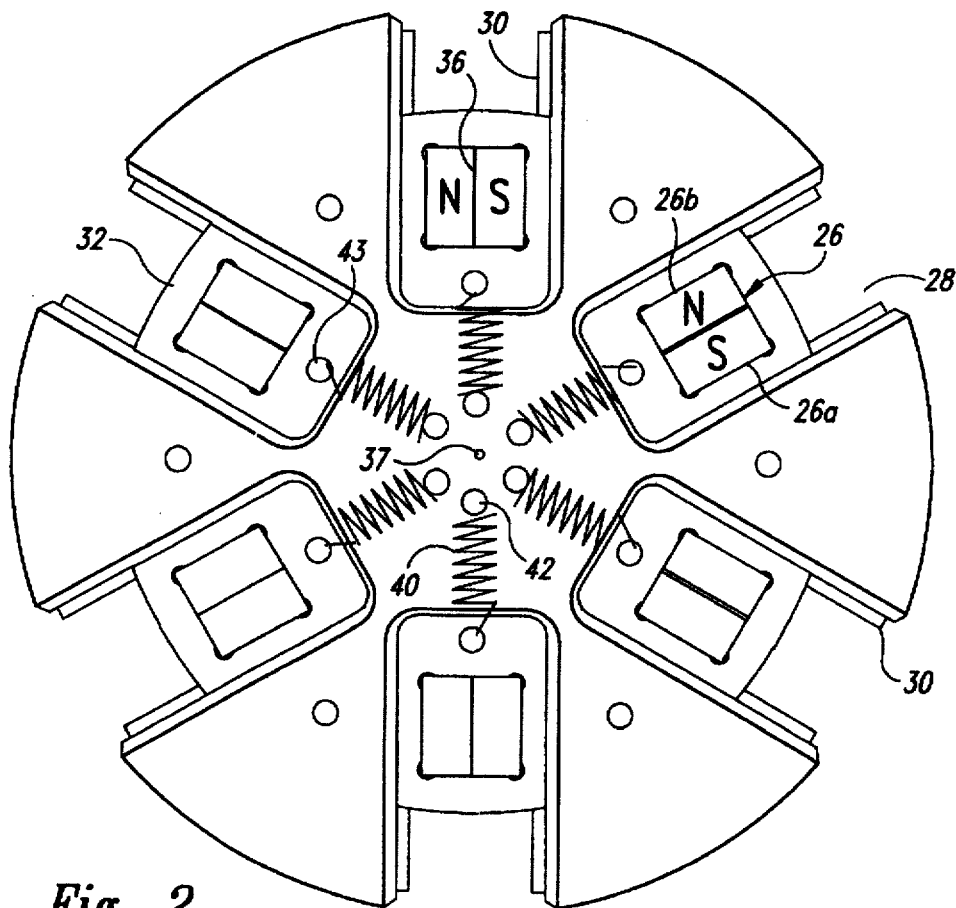
FIG. 2 is a transverse elevational view of the magnet rotor of FIG. 1 taken from the right side of FIG. 1 and with the hub assembly removed.
Figure 3:
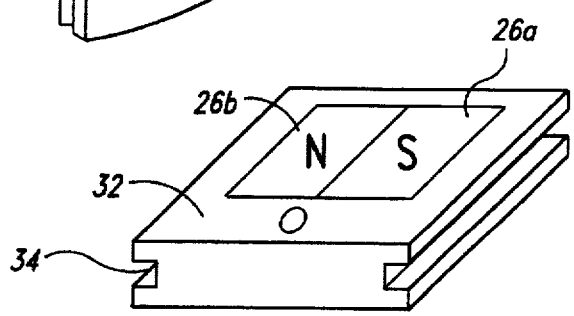
FIG. 3 is a perspective view of one of the magnet holder units in the magnet rotor.
Figure 4:
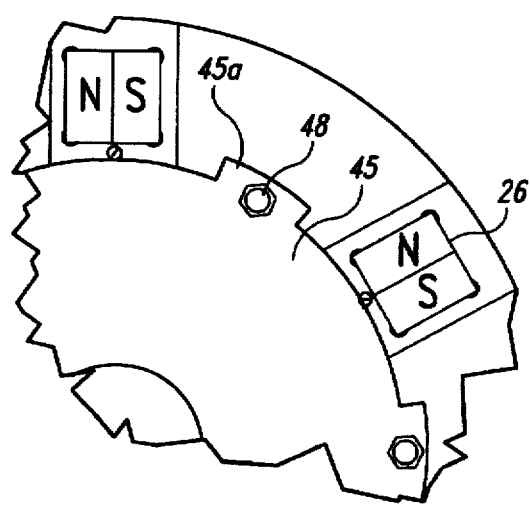
FIG. 4 is a fragmentary elevational view of the hub extension taken as indicated by line 4—4 in FIG. 1.

Each holder 32 has a square cutout in which a set 26 of the magnets is mounted. The magnets 26a–26b in each set 26 are arranged so that the poles of each magnet 26a have their polarity reversed relative to like facing poles of each magnet 26b. Hence, the magnet poles facing the electroconductive ring 16 alternate in polarity around the magnet rotor 14, and the same is true of the magnet poles facing the electroconductive ring 17. Furthermore, as indicated in FIG. 2, the longitudinal side faces of the magnets in each set 26 which face one another define a neutral plane 36 therebetween which extends radially from the rotary axis 37 of the shaft 10 for maximum performance of the magnets.

The tracks 30 have sufficient length (a) to give the magnet holders 32 an inner retracted position at which the sets of magnets 26a–26b are located radially inward with respect to the electroconductive rings 16–17, i.e., the magnets 26a–26b are not overlapped by the orbits of the rings 16–17, and (b) to give the magnet holders 32 an outward expanded position at which the sets of magnets 26a–26b are completely overlapped by the electroconductive rings 16–17 and are separated by air gaps 38–39 therefrom.

The magnet holders 32 are biased toward their retracted position as by tension springs 40 which are connected to projecting portions of respective inner and outer pins 42–43 which are preferably stainless steel and project in the direction of the input shaft 10 from the body of the disc 24 and from an inner end portion of the magnet holders 32, respectively. The springs 40 are enclosed by a hub extension housing 45 which is connected by bolts 46 to a hub 47 and has outwardly extending mounting flanges 45a which are mounted by screws 48 on the body of the disc 24 between the cutouts 28. Adequate clearance is provided between the rim of the housing 45 and the magnet holders 32 at the cutouts 28 so that the magnet holders 32 are free to slide on the tracks 30. The magnet holders 32, disc 24, housing 45, and hubs 20, 47 are preferably aluminum and the backing ring 18 and backing plate 19 are preferably mild steel. The couplings 12–13 are preferably wedge-type units in which split rings with complementing wedge faces are axially pulled together by tightening bolts to expand the outer ring against the surrounding hub and contract the inner ring against the surrounded shaft. It will be understood that instead of providing couplings 12–13, the hubs 47 and 20 may be key-connected to the shafts 10–11.

From the foregoing description it is seen that the magnet rotor unit comprises hub 47, hub extension housing 45, disc 24, magnet holders 32, and magnet set 26, and that the electroconductive rotor unit comprises hub 20, backing plate 19, backing ring 18, spacers 22, bolts 23, and electroconductive rings 16–17.

The operation of the first embodiment will now be described. When the input shaft 10 is rotated the magnet holders 32 and associated sets 26 of magnets are urged to slide outwardly by centrifugal force in opposition to the bias of the springs 40. As the magnets move outwardly between the electroconductive rings 16–17 their magnetic fields induce eddy currents in the rights 16–17 thereby causing the electroconductive rotor unit to start rotating at a lower speed. When the rotational speed of the input shaft 10 reaches a predetermined level the magnet holders reach their outer level of travel established by engagement of the outer pins 43 with the housing 45 as a stop, or by any other suitable stop arrangement. With the magnet holders 32 at their outer limit of travel the magnets 26a, 26b are completely located between the orbits of the electroconductive rings 16–17 and maximum torque output is achieved at which the output shaft 20 is driven via the clutch with some slip relative to the input shaft 10. If the load on the output shaft becomes excess the amount of slip will responsively increase.

The described centrifugal clutch assembly can also be used as a soft-start coupler by connecting the shaft 11 to the power source and connecting the shaft 10 to the load so that the shaft 11 becomes the input shaft and the shaft 10 becomes the load shaft. Also, the retracted position of the magnet holders 32 is changed so that the magnets 26a–26b are slightly overlapped by the orbits of the electroconductive rings 16–17 when the magnet holders 32 are fully retracted. This initial overlap is made adequate to cause the magnet rotor 14 to start to rotate responsive to the rotation of shaft 11. As the magnet rotor 14 picks up speed its magnet holders 32 and sets of magnets move outwardly thereby increasing the exposure of the electroconductive rings 16–17 to the fields of the magnets and a resulting pick up in speed of the magnet rotor until the shaft 10 reaches a speed of minimum slip relative to the shaft 11. Instead of having a slight overlap of the magnets 26a–26b with both electroconductive rings 16–17 when the magnet holders are fully retracted, one of the rings 16–17 may be made wider by reducing its inner radius so that the widened inner portion will be overlapped by the magnets when the magnet holders are in retracted position.

Figure 6:
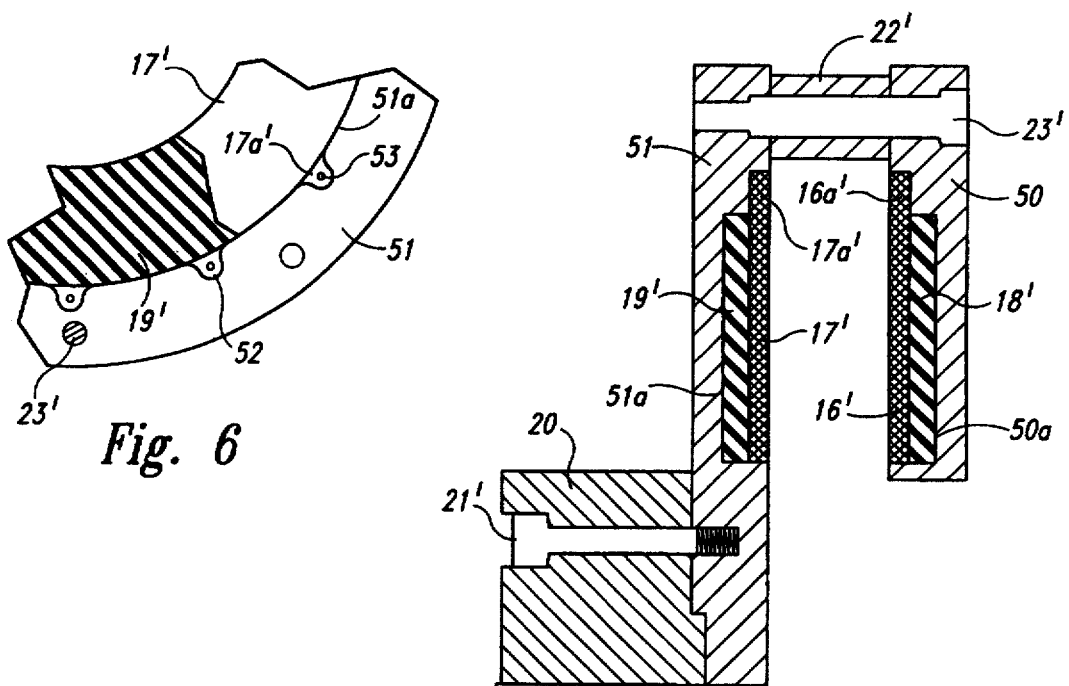
FIG. 6 is a fragmentary elevational view taken as indicated by line 6—6 in FIG. 5.
Figure 5:
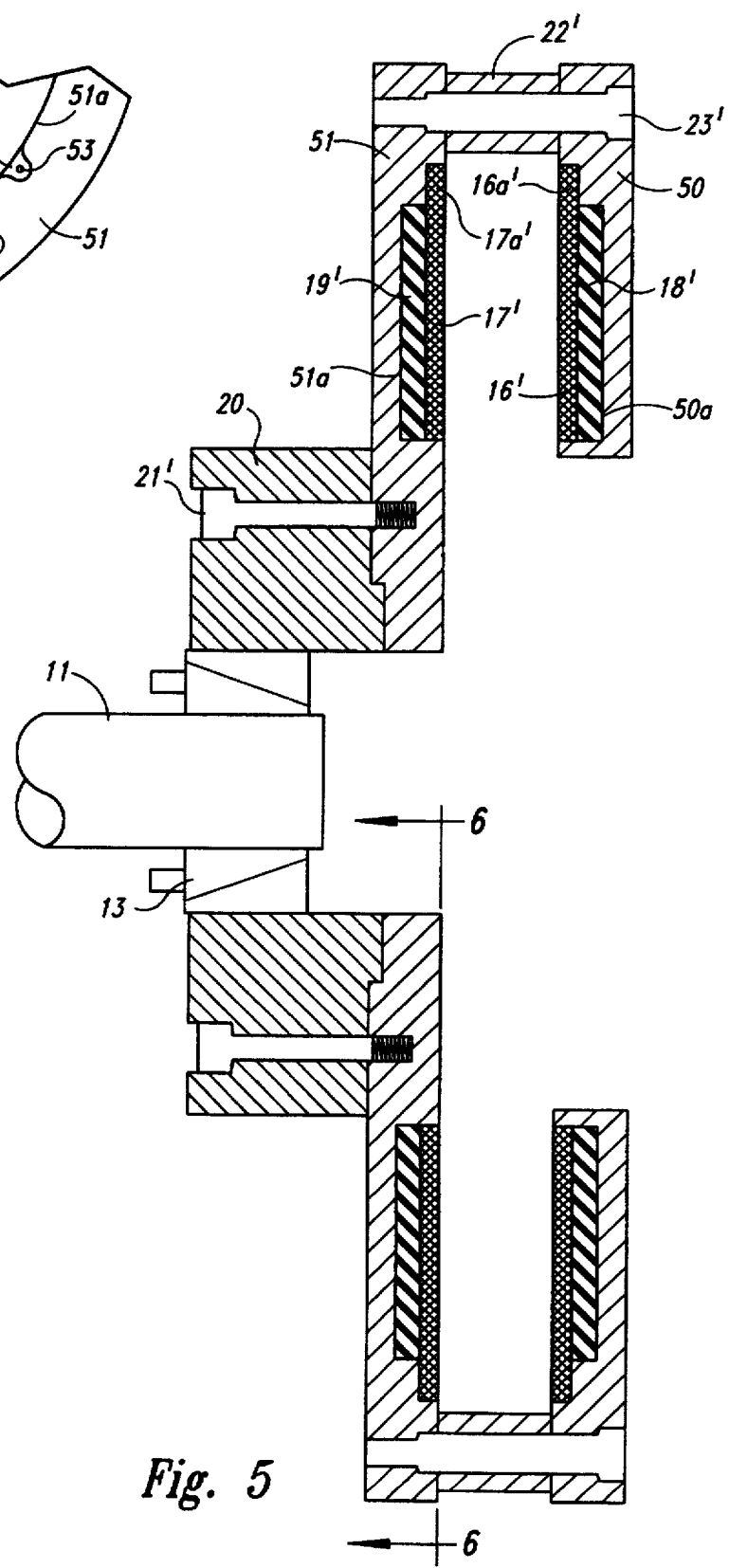
FIG. 5 is a sectional view like FIG. 1 showing a second embodiment of the electroconductive rotor assembly.

An alternative electroconductive rotor unit 15' is shown in FIG. 5 wherein the ferrous backing 18–19 for the electroconductive rings 16–17, and the electroconductive rings 16–17, are mounted on an aluminum support ring 50 and support plate 51. In this rotor unit 15' the electroconductive rings are designated 16'–17' and their ferrous backing comprises mild steel rings designated 18'–19', respectively. The support members 50–51 are each formed with like annular recesses 50a–51a of a thickness to receive respective of the backing rings 18'–19' and electroconductive rings 16'–17' in stacked relation. It is preferred to have the mouth of the recesses 50a–51a countersunk with a pattern of indentations 52 (FIG. 6) matching lobes 16a'–17a' provided on an expanded outer border portion of the electroconductive rings 16'–17' which extends beyond the outer marginal edge of the support rings 18'–19'. Mounting screws 53 extend through the lobes 16a'–17a' into the support members 50–51. The latter are held in spaced relation by spacer sleeves 22' and bolts 23'. Bolts 21' anchor the support plate 51 to the hub 20.

Figure 7:
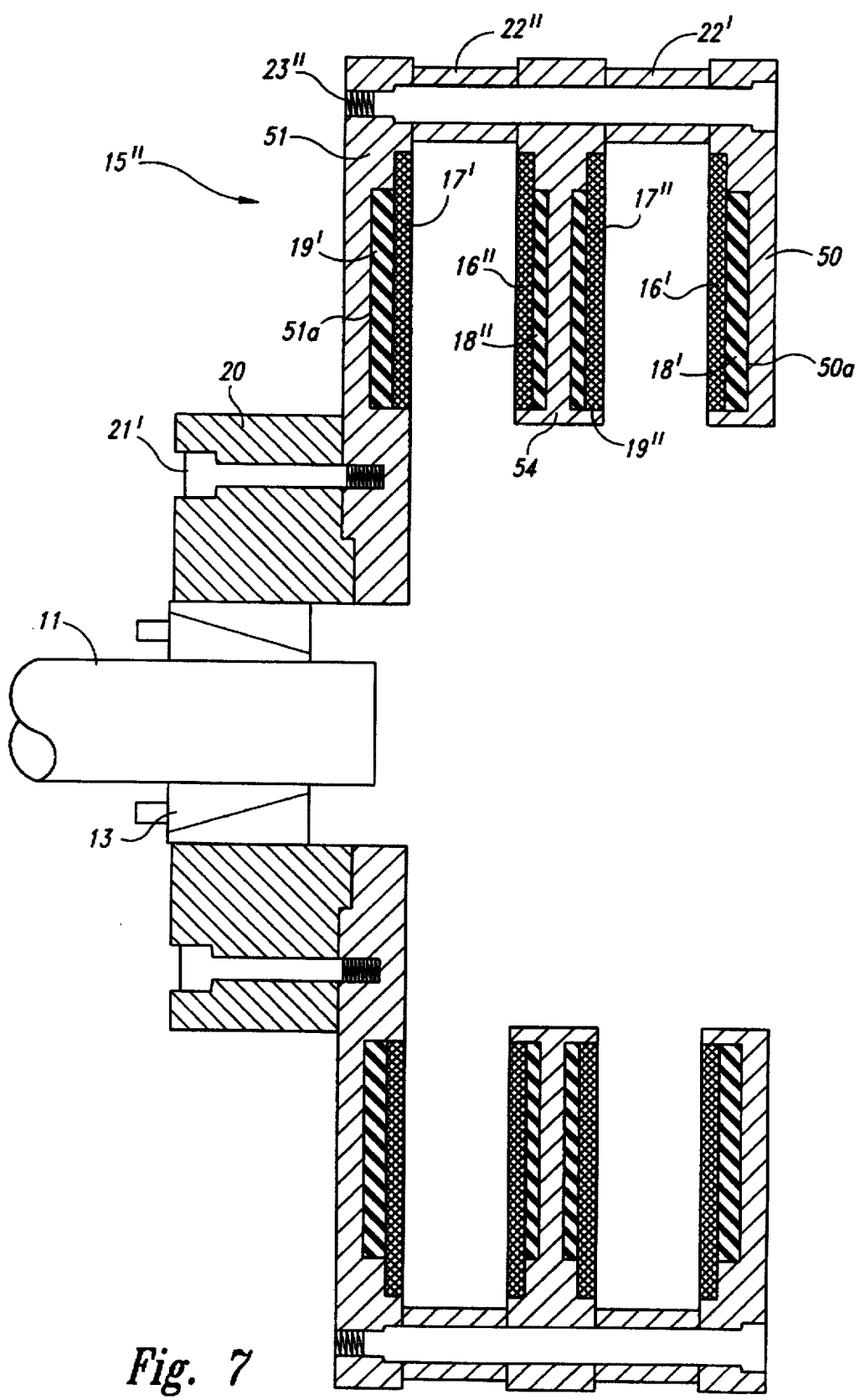
FIGS. 7 and 8 are sectional views taken like FIG. 1 and showing a third embodiment of the electroconductive rotor assembly and a complementing second embodiment of the magnet rotor assembly.
Figure 8:
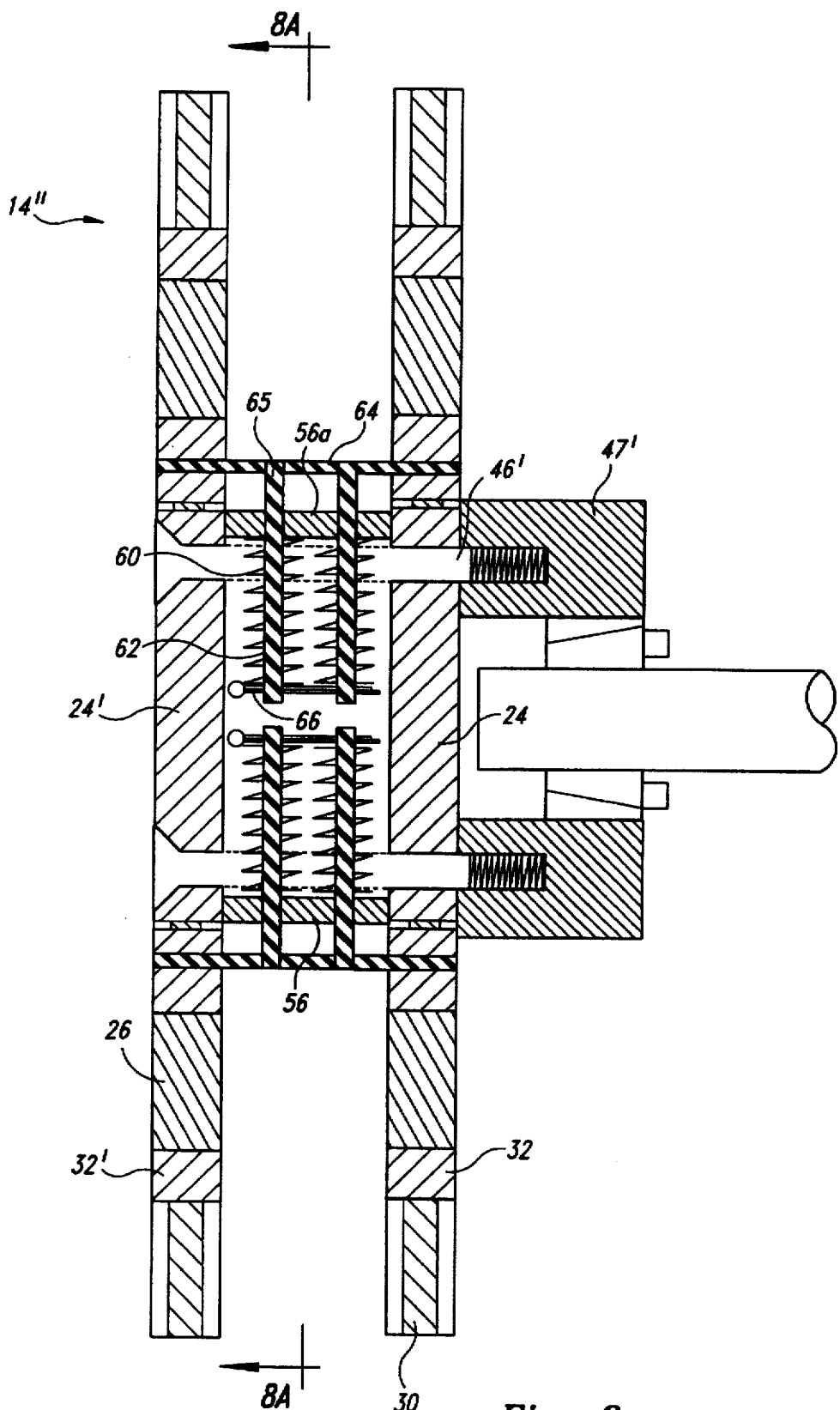
Figure 8A:
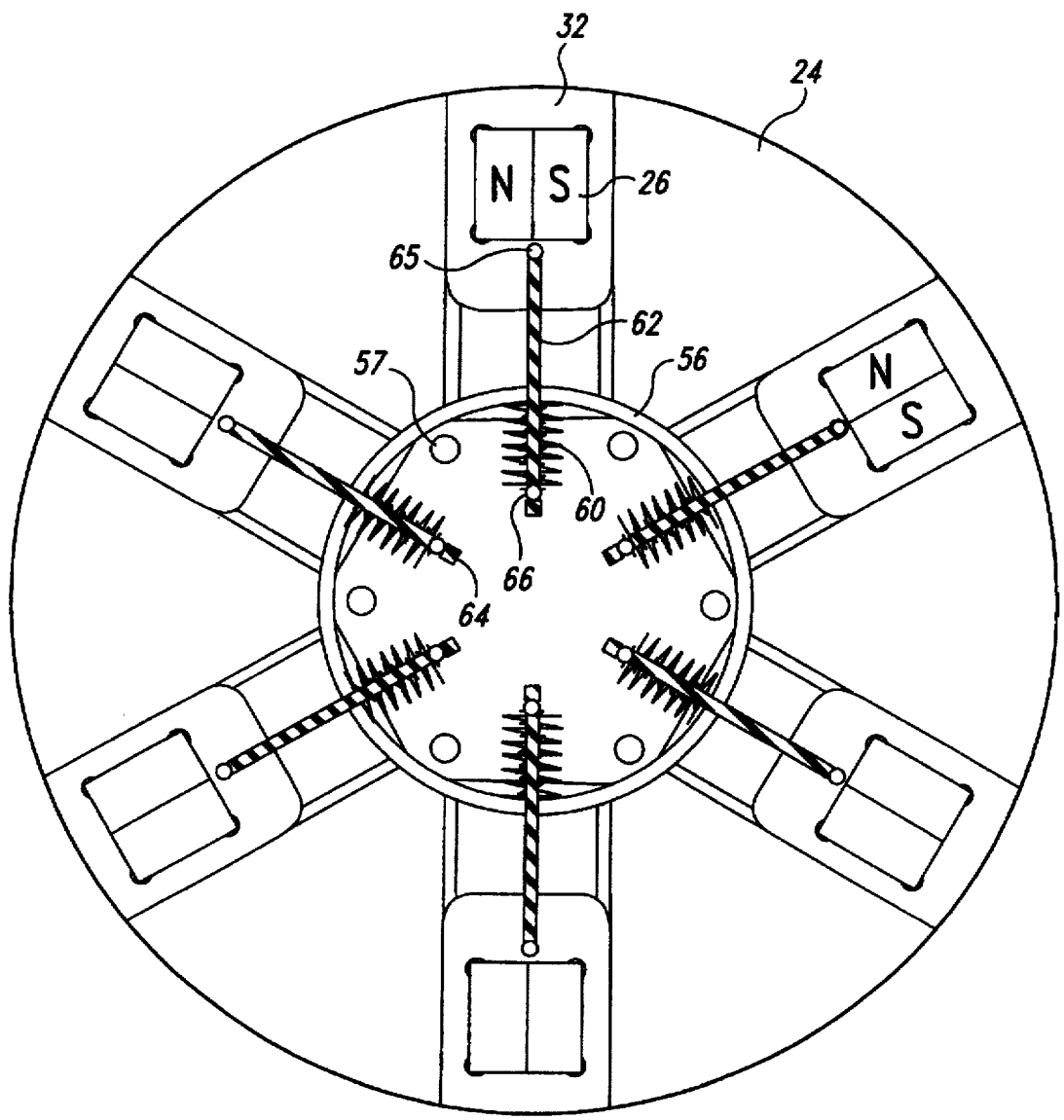
FIG. 8A is a fragmentary transverse sectional view taken as indicted by line 8A—8A in FIG. 8.

In a further embodiment of the invention (FIGS. 7 & 8) an electroconductive rotor unit 15" is provided like the rotor unit 15', but having an intermediate support ring 54 added which has recesses like recess 51a on its opposite sides receiving electroconductive rings 16", 17" and ferrous backing rings 18", 19". Additional spacer sleeves 22" are provided in alignment with the spacer sleeves 22'. The bolts 23" passing through the spacers 22', 22" and through registering openings in the outer and intermediate support rings 50, 54 and support plate 51 hold the support rings and plate together as a unit.

A complementing magnet rotor unit 14" with a pair of magnet carrying discs 24, 24' is provided for use with the electroconductive unit 15". The discs 24, 24' are spaced apart by a cylindrical brass spacer 56 and are tied together by bolts 46'. Each of the discs 24, 24' has radial cutouts with side tracks 30 therealong for slidably receiving magnet holders 32 grooved along their longitudinal side edges and containing pairs 26 of magnets with reversed poles as before. The magnet holders on disc 24' are designated 32'.

Instead of using tension springs to bias the holders 32, 32' inwardly, the biasing is performed by compression springs 60 seating at their outer ends against the inside face of the spacing cylinder 56. Extending longitudinally through the compression springs 60 are pull pins 62 which project inwardly from weld connections to cross-pins 64 each of which has opposite end portions fitting into respective holes in two of the magnet holders 32, 32' near the inner end thereof. The pull pins 62 slide freely through radial holes 56a in the spacing cylinder 56. Adjacent their inner ends the pull pins have axially extending through-bores for receiving cotter keys 66 on which the inner ends of the springs 60 are seated.

Each cross-pin 64 and the related pull pins 62 are manufactured as a pin unit 65. Initially these pin units 65 are positioned with their pull pins 62 registering with respective of the radial holes 56a in the spacing cylinder 56. As each pin unit is introduced to the spacing cylinder a pair of compression springs 60 are placed endwise over the pull pins 62 of the unit. A single cotter key 66 is then inserted through the aligned holes near the inner end of the pull pins. After the pin units 65 and compression springs 62 have been installed with the spacing cylinder 56 as a pin/spacer unit, this unit is positioned over the disc 24' when its magnet holders 32 are positioned at the inner end of their tracks. This positions the pin holes in the holders 32' in proper position to receive one end of all of the cross-pins 64 of the pin/spacer unit. The intermediate support ring 54 with its electroconductive rings 16", 17" and ferrous backing rings 18", 19" installed is then positioned over the magnet rotor disc 24'. Then the other magnet rotor disc 24 with a hub 47' mounted thereon by bolts 46', and with its magnet holders 32 also at the inner end of their tracks is positioned so that the magnet rotor disc 24 can be lowered and have the cross-pins 64 register with the pin holes in its magnet holders 32. The discs 24, 24' are then tied together against the ends of the spacing cylinder 56 by the bolts 57. With the described arrangement it is seen that outward movement of the magnet holders 32, 32' in the pair of coacting magnet rotor discs 24, 24' is yieldingly opposed by the compression springs 60. The magnet rotor unit 14" and the intermediate support ring 54 with its electroconductive rings 16", 17" and ferrous backing rings 18", 19" attached, can then be assembled with the remainder of the electroconductive rotor unit 15" by use of the tie bolts 23" and sets of spacers 22' and 22".

Figure 9:
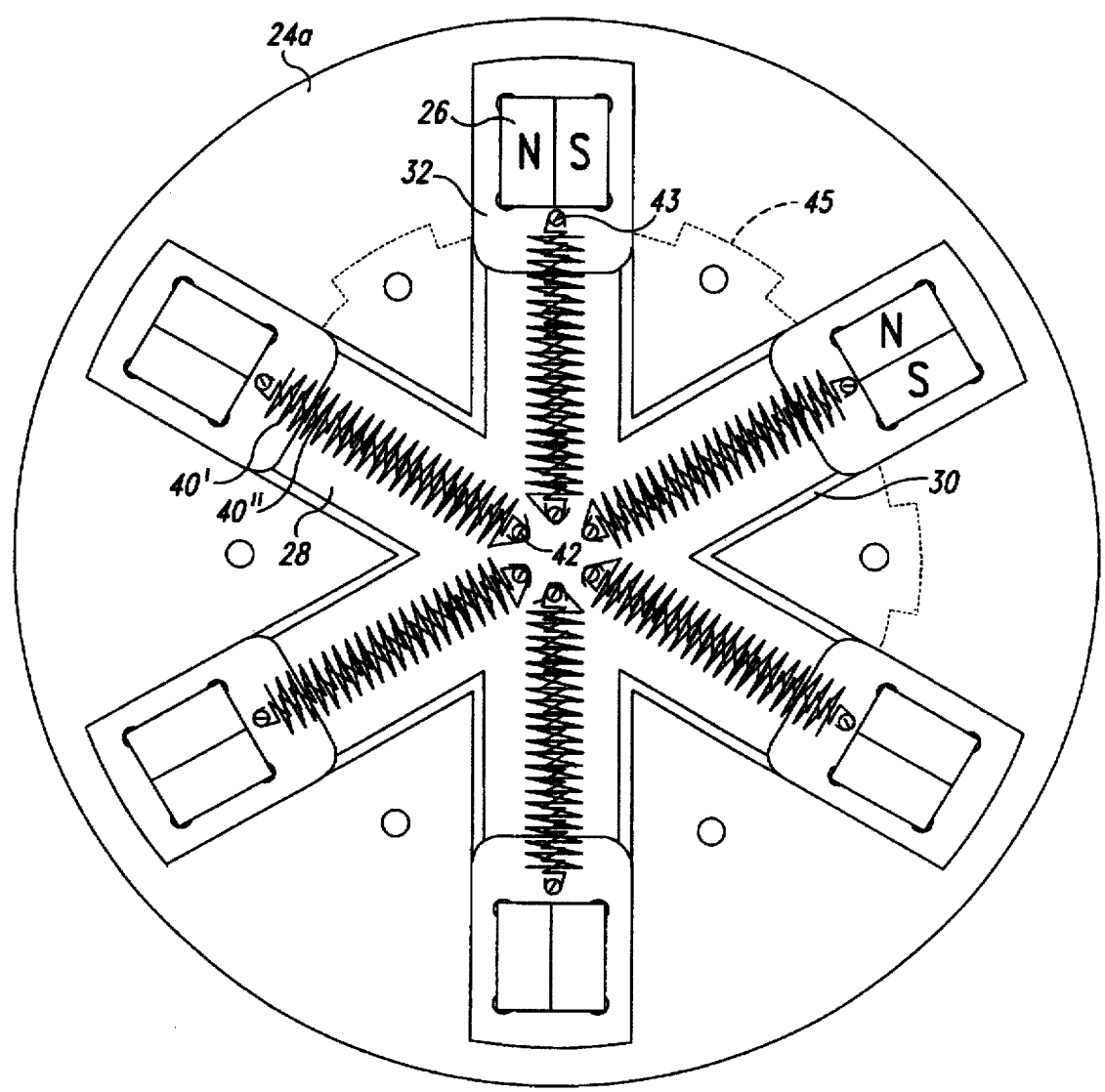
FIG. 9 is an elevational view like FIG. 2 and showing a modified spring arrangement for biasing the magnet holder units.

In the embodiments described previously the magnet holders and their magnets are loaded into the magnet rotor through the outer ends of the cutouts 28 which extend radially outward to the periphery of the magnet rotor. As shown in FIG. 9 the radial cutouts, designated 28', may be open at their inner ends rather than their outer ends, in which case a central portion of the magnet rotor is open to an extent permitting each magnet holder 32 to be positioned in the open central portion and introduced endwise to the tracks 30 of the respective cutout.

The hub extension housing 45 has its mounting flanges bolted to the magnet rotor as before and presents spring mounting pins 42' adjacent the center of the hub, one opposite the inner end of each cutout 28'. These pins 42' project far enough to receive the inner ends of dual tension springs 40', 40" having their other ends looped around complementing mounting pins 43' on the inner end portions of the magnet holders.

When the tension springs 40', 40" are in a non-loaded condition the magnet holders 32 are retracted such that the magnet sets 26 are located radially inward of the electroconductive element orbits. When the tension springs 40', 40" are tensioned responsive to centrifugal force on the holders and their magnets responsive to rotation of the magnet rotor, the magnet holders slide radially to the outer ends of the tracks where the portion 24a of the magnet rotor outwardly of the outer ends of the radial cutouts 28' serve as stops.

Figure 10:
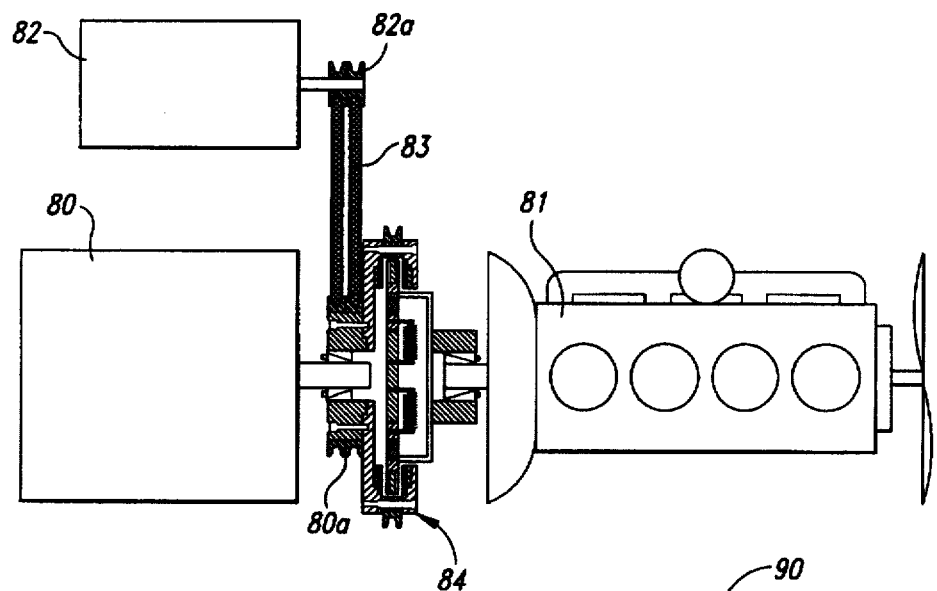
FIG. 10 is a schematic layout of the drive arrangement for the refrigeration compressor in a reefer.

As indicated in FIG. 10, the refrigeration plant for "reefer" trucks or trailers commonly has a compressor 80 aligned with an internal combustion engine 81 and side-by-side with an electric motor 82. The input shaft of the compressor is continuously connected to the output shaft of the motor 82 by a belt 83 extending between sheaves 80a and 82a on the shafts of the compressor and motor. The output shaft of the engine 81 is connected to the input shaft of the compressor by a centrifugal mechanical clutch 84 located between the sheave 80a and the engine. When the reefer is underway the engine 81 is used to power the compressor and when the reefer is at a loading dock where electricity is available, normally the motor 82 is used to drive the compressor. Heretofore, when the compressor has been driven by the engine the engine vibration has transferred through the clutch 84 to the compressor and the related bearings. However, when one of the centrifugal clutches of the present invention is used rather than a mechanical centrifugal clutch no engine vibration is transferred via the clutch.

Figure 11:
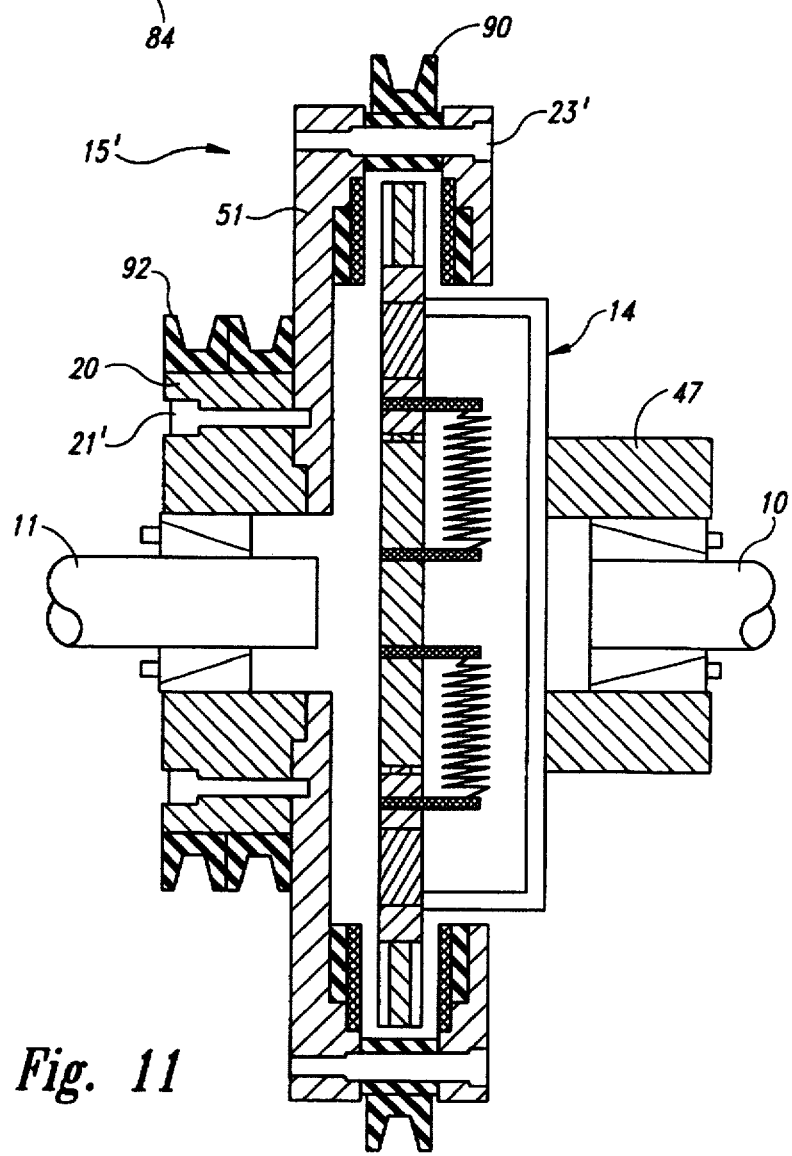
FIG. 11 is a sectional view like FIG. 1 showing sheave additions to the electroconductive rotor assembly.

Referring to FIG. 11, to enable a particularly compact drive arrangement between the engine 81 and compressor 80 in a reefer refrigeration system like that shown in FIG. 10 utilizing a centrifugal clutch like that in FIG. 5, for example, the electroconductive rotor 15' may be provided with a double sheave 90 in place of the spacers 22 with the bolts 23 passing through the sheave. Also, one or more sheaves 92 can be mounted on the hub 20 as shown.

Figure 12:
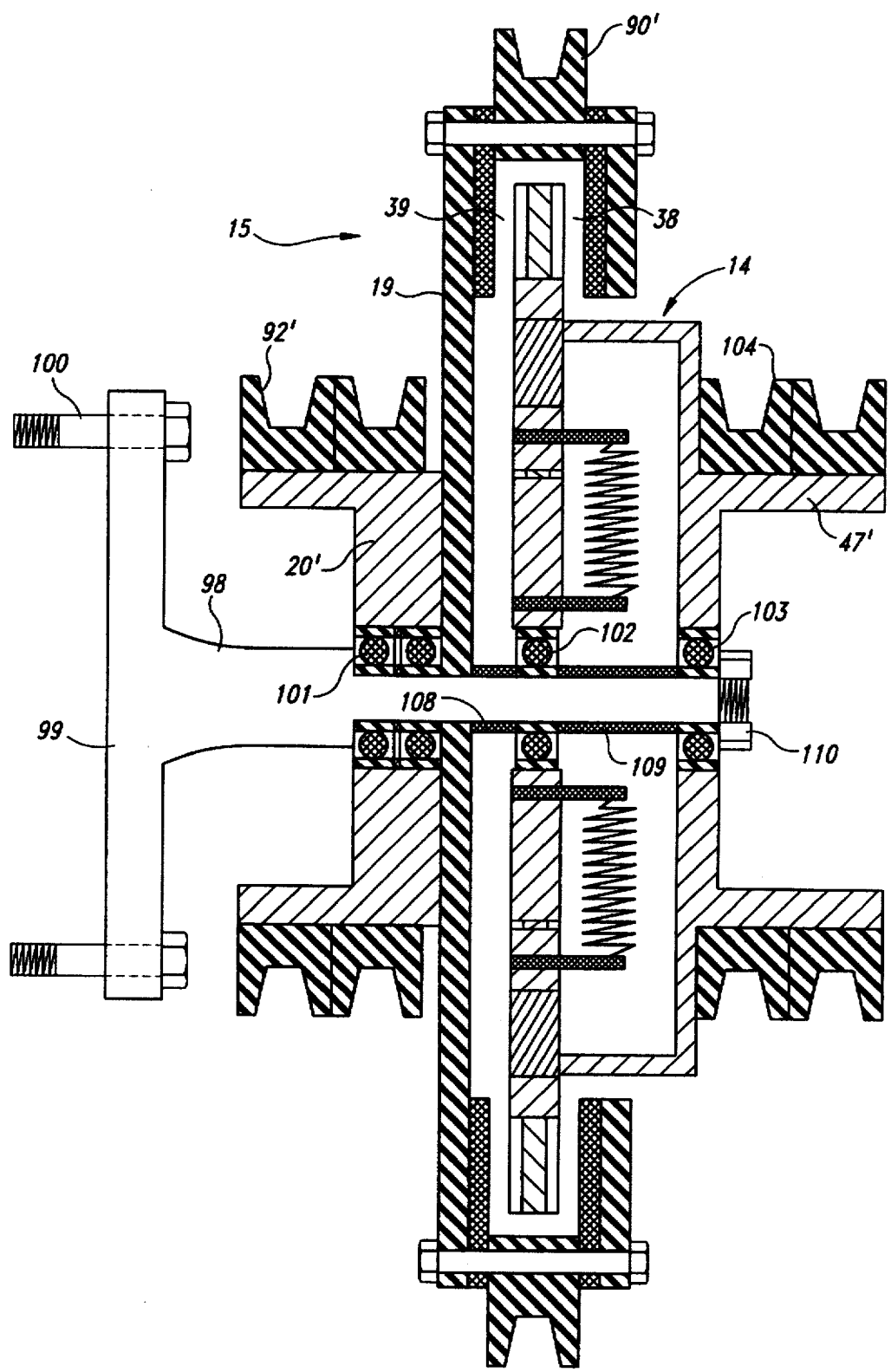
FIG. 12 is a sectional view like FIG. 11 showing a modified drive and takeoff arrangement having a stationary shaft.

Referring to FIG. 12, there is shown an arrangement in which a stationary stepped stub shaft 98 projecting from a flange 99 mounted by bolts 100, has the inner races of three bearing units 101–103 mounted thereon. Bearing 101 provides journal support for the hub 20' of a double sheave 92' connected to the electroconductive rotor unit 15 in place of the hub 20, and bearings 102–103 provide journal support for the magnet rotor unit 14 which has a modified hub 47' to receive a double sheave 104'. A sheave 90' may also be provided in the manner of sheave 90 in FIG. 11. Spacers 108–109 are provided on the shaft 98 between the inner races of the bearings 102–103 and between the inner race of bearing 102 and the plate 19 to maintain equal air gaps 38, 39. The assembly is retained on the shaft 98 by a nut 110. With this stub shaft arrangement the magnet rotor 14 may be driven by a belt drive to the sheave 92 from a power source, and a power takeoff can be taken by belts from the sheaves 104 or 90' on the electroconductive rotor unit 15.

Although coil springs have been illustrated and described as the means for biasing the magnet holders inwardly in opposition to centrifugal force, it will be appreciated that other biasing means would be suitable such, for example, as air springs. It will be appreciated that the sheaves shown in FIGS. 11–12 can be sprockets for chain drives rather than having belt drives.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A centrifugal clutch comprising:

a first rotor having a first rotary axis and having a band of non-ferrous electroconductive material spaced outwardly from said axis by a radial distance;

a second rotor facing said first rotor, and having a second rotary axis aligned with said first rotary axis;

and permanent magnets moveably mounted on said second rotor such as to move outwardly relative to said second rotary axis responsive to centrifugal force resulting from rotation of said second rotor from an inactive inner position to an active outer position wherein poles of said magnets are spaced by an air gap from said band, said magnets being located mostly within a circle on said centered on said second axis and having a radius equal to said radial distance when said magnets are in said inner position;

and force applying components on said second rotor applying a return force to said magnets directed inwardly toward said second axis for returning said magnets to their inner position when said second rotor is not rotating, said return force being insufficient to overcome said centrifugal force when said second rotor is rotating at least at a preset speed.

2. A centrifugal clutch according to claim 1 in which said magnets are located entirely within the perimeter of said circle when the magnets are in said inner position so as to be entirely inactive when in said inner position.

3. A centrifugal clutch according to claim 1 in which said magnets are mounted in holders which are slide-mounted on said second rotor to move said magnets between their said inner and outer positions.

4. A centrifugal clutch according to claim 3 in which said force applying components include springs extending between said holders and said second rotor.

5. A centrifugal clutch according to claim 1 in which said second rotor has outwardly extending tracks and has holders in which said magnets are mounted, said holders being slide-mounted on said tracks to move said magnets between their said inner and outer positions.

6. A centrifugal clutch according to claim 5 in which said tracks and said holders have a tongue and groove interfit.

7. A centrifugal clutch according to claim 1 in which said force applying components are mounted at the side of said second rotor which faces oppositely from said first rotor.

8. A centrifugal clutch according to claim 7 in which said force applying components are covered by a housing mounted on said second rotor, said housing having a hub thereon for mounting on a shaft.

9. A centrifugal clutch according to claim 1 in which said first rotor also presents a second band of electroconductive material which is axially spaced from said first-mentioned band so as to be spaced by a gap from the poles of said magnets which are opposite in polarity from said first-mentioned poles when said magnets are in their said outer position.

10. A centrifugal clutch according to claim 9 in which each of said magnets has oppositely directed poles which are reversed in position relative to the poles of adjacent magnets so that poles of alternating polarity face each of said bands.

11. A centrifugal clutch according to claim 9 in which each of said bands is backed by ferrous material.

12. A centrifugal clutch according to claim 9 in which force applying components are covered by a housing mounted on said second rotor and occupying space radially inward of said second band, said housing having a hub for mounting on a shaft.

13. A centrifugal clutch according to claim 1 in which said band is backed with a backing band of ferrous material.

14. A centrifugal clutch according to claim 13 in which said first rotor is of an aluminum material and said bands are mounted thereon.

15. A centrifugal clutch according to claim 1 in which said second rotor has an aluminum body carrying said magnets.

16. A centrifugal clutch according to claim 3 in which said holders are primarily of an aluminum material.

17. A centrifugal clutch according to claim 3 in which said holders contain two side by side magnets having their respective poles facing in opposite directions.

18. A centrifugal clutch according to claim 9 in which magnets are mounted in holders which are slide-mounted on said second rotor to move said magnets between their said inner and outer positions, each of said holders containing side-by-side magnets arranged so that each of said bands faces magnet poles of alternating polarity when said magnets are in their said outer position.

19. A centrifugal clutch according to claim 18 in which said force applying components are connected to said holders and second rotor, and are covered by a housing mounted on said second rotor and extending through space located radially inward of said second band.

20. A centrifugal clutch according to claim 19 in which said force applying components comprise springs connected to pins projecting axially from said holders and second rotor into said housing.

21. A centrifugal clutch according to claim 1 in which said first rotor has a sheave mounted thereon concentric with said rotary axis.

22. A centrifugal clutch according to claim 1 in which said first and second rotors are journal-mounted on a stationary shaft and said rotors have sheaves mounted thereon concentric to said shaft.

23. A centrifugal clutch according to claim 1 in which said second rotor has a sheave mounted thereon concentric to said rotary axis.

24. A centrifugal clutch according to claim 8 in which said housing has a sheave mounted thereon concentric to said rotary axis.

25. A centrifugal clutch according to claim 24 in which said first rotor also has a sheave mounted thereon concentric to said rotary axis.

26. A centrifugal clutch comprising:

a first rotor having a rotary first axis and having first and second bands of non-ferrous electroconductive material each spaced outwardly from said axis by a radial distance, said bands being axially spaced apart and facing one another;

a second rotor centered on said first axis and extending radially between said bands, said second rotor having a second rotary axis aligned with said first axis;

permanent magnets;

holders carrying said permanent magnets and slide mounted on said second rotor for radial movement between an inactive inner position in which said magnets are substantially within the perimeter of a circle having said radial distance as a radius and an active outer position in which said magnets are substantially outside said circle and spaced by air gaps from said bands;

and forcing applying elements extending between said second rotor and said holders for applying a return force to said holders toward said inner position, whereby said holders are moved by centrifugal force to said outer position when said second rotor is rotated at a speed in which the centrifugal force counters said return force, and said holders are moved to said inner position by said force applying elements when said second rotor is stationary.

27. A centrifugal clutch according to claim 26 in which said force applying elements comprise springs mounted on pins extending outwardly from said second rotor and holders in a direction axially away from said first rotor;

and in which a housing is connected to said second rotor and covers said pins and springs, said housing extending radially inward of one of said bands and axially away from said first rotor.

28. A coupling device comprising:

a first rotor having a rotary axis and two axially spaced bands of non-ferrous electroconductive material facing one another and spaced outwardly from said axis;

a second rotor centered on said axis;

permanent magnets each having oppositely directed poles and being mounted on said second rotor, said magnets having a position between said bands and having their poles spaced by air gaps from said bands, alternate of said magnets having their poles reversed;

and a sheave mounted on said first rotor and centered on said axis.

29. A coupling device according to claim 28 in which said sheave is located radially outward of said axis from said magnets.

30. A coupling device according to claim 29 in which said first rotor has a hub, and a second sheave is mounted on said hub.

31. A coupling device according to claim 28 in which said second rotor has a hub, and a second sheave is mounted on said hub.

32. A coupling device according to claim 28 in which said magnets are radially moveable on said second rotor relative to said axis, and are spring biased inwardly toward said axis.

* * * * *